(12) United States Patent
Kovtoun

(10) Patent No.: US 11,099,153 B1
(45) Date of Patent: Aug. 24, 2021

(54) COUNTERFLOW UNIFORM-FIELD ION MOBILITY SPECTROMETER

(71) Applicant: Thermo Finnigan LLC, San Jose, CA (US)

(72) Inventor: Viatcheslav V. Kovtoun, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 16/840,044

(22) Filed: Apr. 3, 2020

(51) Int. Cl.
*H01J 49/00* (2006.01)
*G01N 27/622* (2021.01)

(52) U.S. Cl.
CPC .................. *G01N 27/622* (2013.01)

(58) Field of Classification Search
CPC ........ H01J 49/00; H01J 49/02; H01J 49/0027; H01J 49/0031; H01J 49/004; H01J 49/0045; H01J 49/06; H01J 49/061; H01J 49/062; H01J 49/066; H01J 49/26; H01J 49/426; H01J 49/4295; G01N 27/622
USPC .......... 250/281, 282, 283, 286, 290
See application file for complete search history.

(56) References Cited

U.S. PATENT DOCUMENTS

| 6,630,662 | B1 | 10/2003 | Loboda |
| 7,199,362 | B2 | 4/2007 | Rockwood et al. |
| 7,718,960 | B2 | 5/2010 | Hashimoto et al. |
| 8,384,025 | B2 | 2/2013 | Sun et al. |
| 8,642,948 | B2 | 2/2014 | Makarov et al. |
| 9,304,106 | B1 | 4/2016 | Park et al. |
| 2008/0251712 | A1* | 10/2008 | Sanders ............... G01N 27/622 250/282 |
| 2012/0273673 | A1* | 11/2012 | Park ..................... H01J 49/06 250/283 |

FOREIGN PATENT DOCUMENTS

| GB | 2525275 A | 10/2015 |
| GB | 2525275 B | 7/2018 |

OTHER PUBLICATIONS

Matz et al., "Investigation of Drift Gas Selectivity in High Resolution Ion Mobility Spectrometry with Mass Spectrometry Detection", J Am Soc Mass Spectrom 2002, 13, pp. 300-307.
May et al., "Ion Mobility-Mass Spectrometry: Time-Dispersive Instrumentation", Anal. Chem. 2015, 87, pp. 1422-1436.
(Continued)

*Primary Examiner* — Jason L Mccormack
(74) *Attorney, Agent, or Firm* — David A. Schell (57) ABSTRACT

An ion mobility device includes a plurality of electrodes and a current source. The plurality of electrodes arranged along an axis extending from a first end to a second end. The plurality of electrodes configured to receive a gas flow at the second end and provide for an expansion of the gas flow from the second end to the first end such that a first gas velocity at the second end is greater than a second gas velocity at the first end. The current source is configured to apply a first potential to the plurality of electrodes to generate a first electric field during a trapping and equilibration time period; and apply a second potential to the electrodes during an ejection time period to generate a second electric field, the second electric field being greater than the first electric field.

20 Claims, 8 Drawing Sheets

(56) References Cited

OTHER PUBLICATIONS

Sysoev et al., "Development of an ion mobility spectrometer for use in an atmospheric pressure ionization ion mobility spectrometer/mass spectrometer instrument for fast screening analysis", Rapid Commun. Mass Spectrom. 2004, 18, pp. 3131-3139.
Wang et al., "U-Shaped Mobility Analyzer: A Compact and High-Resolution Counter-Flow Ion Mobility Spectrometer", Anal. Chem. 2020, 92, pp. 8356-8363.

* cited by examiner

COUNTERFLOW UNIFORM-FIELD ION MOBILITY SPECTROMETER

FIELD

The present disclosure generally relates to the field of ion chromatography including counterflow uniform-field ion mobility spectrometers.

INTRODUCTION

Ion-mobility spectrometry (IMS) is an analytical technique used to separate and identify ionized molecules in the gas phase based on their mobility in a carrier buffer gas. IMS instruments can be extremely sensitive stand-alone devices, but are often coupled with mass spectrometry, gas chromatography or high-performance liquid chromatography in order to achieve a multi-dimensional separation.

IMS can be used in the source region of modern mass spectrometers to provide an additional dimension of separation based on the ions' shape and size (collisional cross section, CCS). It can be coupled with nearly any mass analyzer through either the standard mode of operation for beam-type instruments or selective accumulation mode when used with trapping mass spectrometry (MS) instruments.

SUMMARY

In a first aspect, an ion mobility device can include a plurality of electrodes and a current source. The plurality of electrodes can be arranged along an axis. The axis can extend from a first end to a second end. The plurality of electrodes can be configured to receive a gas flow near the second end and provide for an expansion of the gas flow from the second end to the first end such that a first gas velocity at the second end is greater than a second gas velocity at the first end. The current source can be configured to apply a first potential to the plurality of electrodes to generate a first electric field during a trapping and equilibration time period and apply a second potential to the electrodes during an ejection time period to generate a second electric field. The first electric field can be uniform along the length of the axis and the second electric field can be uniform along the length of the axis from the first end to the second end. The second electric field can be greater than the first electric field. During the trapping and equilibration time period, ions can be separated along the axis based on their ion mobility to equilibrium positions where the force applied by the electric field balances the drag force applied by the gas flow, and, during the ejection time period, ions can be driven through the second end by the second electric field such that the separation achieved during the trapping and equilibration time period is maintained.

In various embodiments of the first aspect, the gas flow can be constant during the trapping and equilibration time period and the ejection time period.

In various embodiments of the first aspect, the plurality of electrodes can form a channel having a cross section that increases from the second end to the first end.

In various embodiments of the first aspect, the plurality of electrodes can form a channel of uniform cross section. In particular embodiments, at least a subset of the plurality of electrodes create flow paths for the gas flow away from the channel.

In various embodiments of the first aspect, at least a subset of the plurality of electrodes can have a decreasing length or diameter going in the direction from the second end to the first end.

In a second aspect, a method can include providing ions to a first end of an ion mobility device. The ion mobility device can include a plurality of electrodes arranged along an axis extending from a first end to a second end. The method can also include providing a gas flow near the second end of the ion mobility device. The plurality of electrodes can be configured to provide for an expansion of the gas flow from the second end to the first end such that a gas flow velocity decreases from the second end to the first end. The method can further include applying an electric field that is uniform along the axis at a first magnitude in a direction counter to the gas flow, and separating ions to equilibrium positions along the axis based on their ion mobility, the equilibrium positions being where the force applied by the electric field balances the drag force applied by the gas flow. The method can further include ejecting ions through the second end by increasing the electric field to a second magnitude.

In various embodiments of the second aspect, the method can further include ionizing a sample to produce the ions.

In various embodiments of the second aspect, the method further includes analyzing the ions after the ions are ejected.

In various embodiments of the second aspect, the gas flow can be uniform.

In various embodiments of the second aspect, the plurality of electrodes can form a channel of variable cross section.

In various embodiments of the second aspect, the plurality of electrodes can form a channel of uniform cross section. In particular embodiments, at least a subset of the plurality of electrodes can create flow paths for the gas flow away from the channel.

In various embodiments of the second aspect, at least a subset of the plurality of electrodes can have a decreasing length or diameter going in the direction from the second end to the first end.

In a third aspect, a mass spectrometer can include an ion source configured to ionize a sample to produce ions; an ion mobility device, and a mass analyzer configured to analyze the ions.

The ion mobility device can include a plurality of electrodes arranged along an axis and a current source. The axis can extend from a first end to a second end. The plurality of electrodes can be configured to receive a gas flow near the second end and provide for an expansion of the gas flow from the second end to the first end such that a first gas velocity at the second end is greater than a second gas velocity at the first end. The current source can be configured to apply a first potential to the plurality of electrodes to generate a first electric field during a trapping and equilibration time period, and apply a second potential to the electrodes during an ejection time period to generate a second electric field. The first electric field can be uniform along the length of the axis. The second electric field can be uniform along the length of the axis from the first end to the second end and the second electric field can be greater than the first electric field.

During the trapping equilibration time period, ions can be separated along the axis based on their ion mobility to equilibrium positions where the force applied by the electric field balances the drag force applied by the gas flow; and, during the ejection time period, ions can be driven through the second end by the second electric field such that the separation achieved during the trapping and equilibration time period is maintained.

In various embodiments of the third aspect, the gas flow can be constant during the equilibration/trapping time period and the ejection time period.

In various embodiments of the third aspect, the plurality of electrodes can from a channel having a cross section that increases from the second end to the first end.

In various embodiments of the third aspect, the plurality of electrodes can form a channel of uniform cross section. In particular embodiments, at least a subset of the plurality of electrodes create flow paths for the gas flow away from the channel.

In various embodiments of the third aspect, at least a subset of the plurality of electrodes can have a decreasing length or diameter going in the direction from the second end to the first end.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Figure 1:
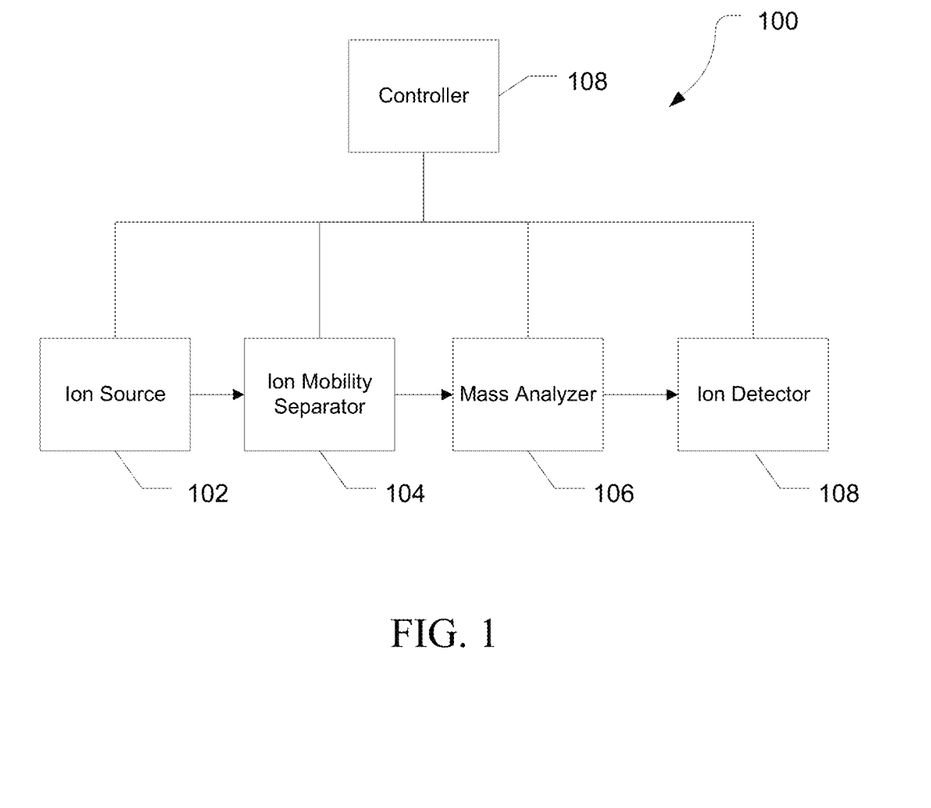
FIG. 1 is a block diagram of an exemplary mass spectrometry system, in accordance with various embodiments.

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, an ion mobility separator 104, a mass analyzer 106, an ion detector 108, and a controller 110.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the ion mobility separator 104 can separate ions based on an ion mobility within a gas. For example, the ion mobility separator 104 can be a drift tube, a traveling wave IMS, a TIMS, field asymmetric ion mobility spectrometer (FAIMS), and the like. In various embodiments, the ion mobility separator can receive ions from the ion source 102 and provide an additional dimension of separator prior to the mass analyzer 106.

In various embodiments, the mass analyzer 106 can separate ions based on a mass-to-charge ratio of the ions. For example, the mass analyzer 106 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 106 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio. In various embodiments, the mass analyzer 106 can be a hybrid system incorporating one or more mass analyzers and mass separators coupled by various combinations of ion optics and storage devices. For example, a hybrid system can a linear ion trap (LIT), a high energy collision dissociation device (HCD), an ion transport system, and a TOF.

In various embodiments, the ion detector 108 can detect ions. For example, the ion detector 108 can include an electron multiplier, a Faraday cup, and the like. Ions leaving the mass analyzer can be detected by the ion detector. In various embodiments, the ion detector can be quantitative, such that an accurate count of the ions can be determined. In various embodiments, such as with an electrostatic trap mass analyzer, the mass analyzer detects the ions, combining the properties of both the mass analyzer 106 and the ion detector 108 into one device.

In various embodiments, the controller 110 can communicate with the ion source 102, the ion mobility separator 104, the mass analyzer 106, and the ion detector 108. For example, the controller 110 can configure the ion source 102 or enable/disable the ion source 102. Further, the controller 110 can configure the ion mobility separator 104 to select a particular range of ion mobilities. Additionally, the controller 110 can configure the mass analyzer 106 to select a particular mass range to detect. Further, the controller 110 can adjust the sensitivity of the ion detector 108, such as by adjusting the gain. Additionally, the controller 110 can adjust the polarity of the ion detector 108 based on the polarity of the ions being detected. For example, the ion detector 108 can be configured to detect positive ions or be configured to detected negative ions.

Trapped Ion Mobility Spectroscopy

Trapped ion mobility spectrometry (TIMS) inverts the separation principle of classical drift tube ion mobility. Ions entering the TIMS device are positioned in an electric field by the drag of a gas flow. The ions become trapped at an equilibrium position where the force of the electric field and the force of the drag of the gas flow are balanced. In TIMS, ions are held stationary (or trapped) in a flowing buffer gas by an axial electric field gradient (EFG) profile while the application of radio frequency (rf) potentials results in trapping in the radial dimension.

Figure 2A:
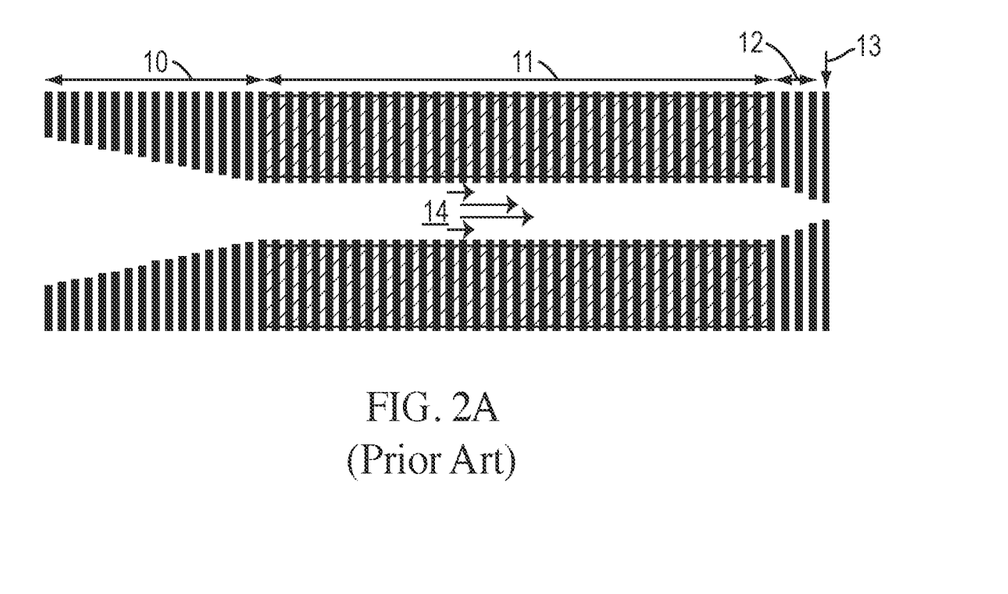
FIGS. 2A and 2B illustrate the operation of a prior art Trapping Ion Mobility Separator (TIMS) device.
Figure 2B:
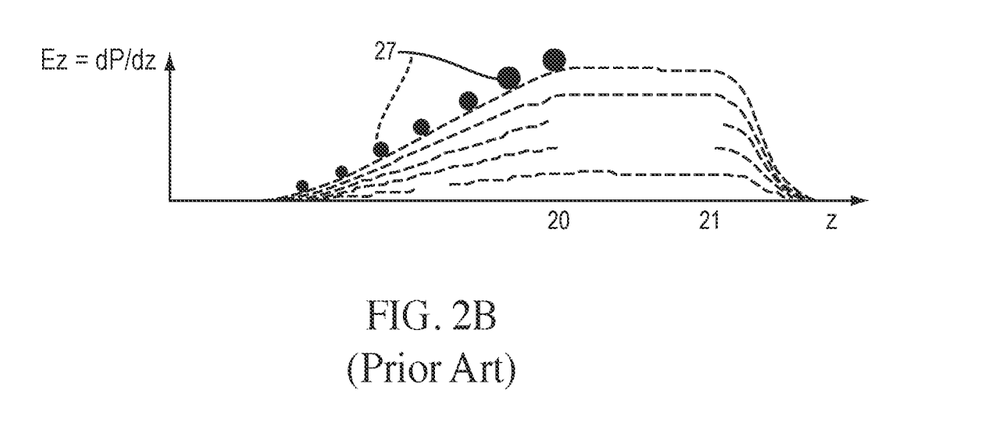

U.S. Pat. No. 7,838,826 B1 (M. A. Park, 2008) discloses a trapped ion mobility spectrometer based upon moving gases driving ions over an electric counter-field barrier. The apparatus and its operation are schematically illustrated in FIGS. 2A and 2B. FIG. 2A shows a closed quadrupole device (11), vertically sliced into thin electrodes forming a circular tube arranged around the z-axis of the device. The electrode slices are separated by insulating material closing the gaps between the electrodes around the tube to make the tube gas-tight. The differential pumping system of a mass spectrometer (not shown), surrounding the ion mobility spectrometer, is dimensioned to cause a gas to flow through the tube in a positive x direction. Ions entering the first part (10) of the funnel together with the gas are collisionally focused onto the axis of the tube (11) and move, driven by the gas, along the axis of the tube towards its exit through the apertured diaphragm (13). Most of the gas escapes through gaps between the electrodes of the funnel part (12).

FIG. 2B shows different field barriers of the electric counter field $E_z = dP/dz$ along the z-axis. The operation of the device starts with a filling process. The ions (27) are blown by the gas flow against the field barrier and are stopped because they cannot surmount the field barrier. Ions with high mobility (small cross section) gather at the foot of the barrier, ions with low mobility gather (large cross section) near the summit, as symbolically indicated by the size of the dots for the ions (27). Then, for a spectrum acquisition, the potential profile (22) is smoothly lowered by decreasing the voltage continuously in a procedure denominated as a "scan" (28), passing through profile states (23) to (26). During the scan, ions of higher and higher mobilities can surmount the decreasing summit of the barrier and exit the ion mobility spectrometer.

As shown in FIG. 2B, a characteristic feature of this instrument is the long increasing part of the electric field barrier until position (20), the start of the plateau. This long ascent between foot and top of the barrier collects the ions (27) in a rather large volume along the z-axis, reducing greatly any space charge effects.

An ion's drift velocity $v_d$ is a function of ion mobility K and electric field strength E, $v_d = KE$. An ion becomes trapped within an TIMS device when the total velocity falls to 0, $v = v_g + v_d = 0$.

Ion mobility for a particular ion K(m) is a function of temperature T and pressure p within the TIMS, $$K(m) = K_0(m) \frac{T}{T_0} \frac{p_0}{p}$$

where $T_0$ and $p_0$ are standard temperature and pressure. The ion mobility K(m) within the TIMS can be simplified to a function of pressure and temperature $K(m) = K_0'(m) * p/T$. Thus, with a constant E, the ion velocity can change with location v(x) when the pressure changes with location p(x) and the ion can become trapped at a position along the length of the TIMS device when v(x)=0.

Figure 3A:
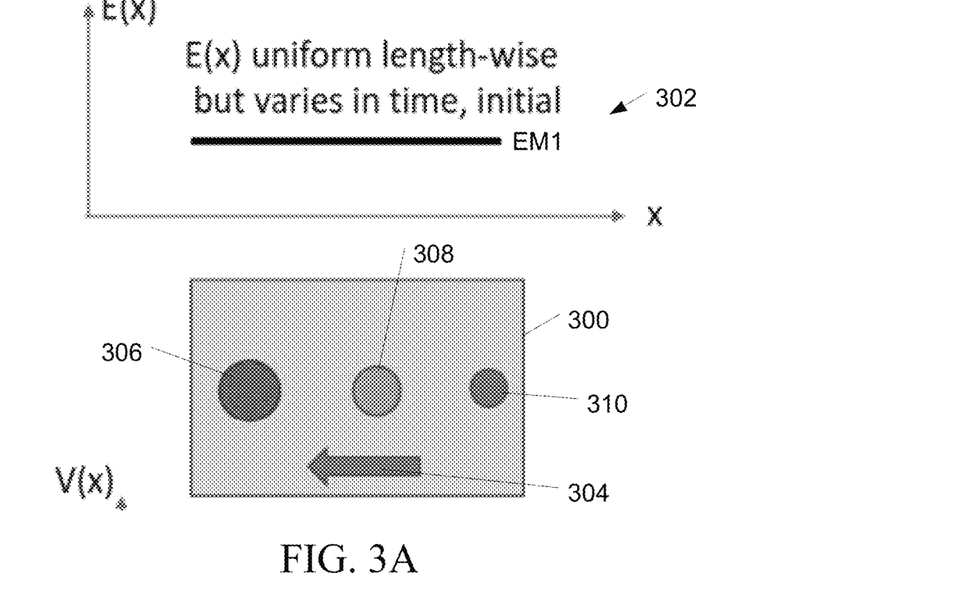
FIGS. 3A and 3B separation of ions in a TIMS device, in accordance with various embodiments.

FIG. 3A illustrates ions trapped in a TIMS device 300. In contrast to the prior art device of U.S. Pat. No. 7,838,826 B1, the TIMS device 300 has a constant electric field 302 and a gas flow 304 directed in the negative x direction. With the constant electric field 302 of magnitude $E_{m1}$ along the length of the TIMS device 300 and the gas flow 304 directed in a negative x direction, low mobility ions 306, medium mobility ions 308, and high mobility ions 310 can be separated with increasing ion mobility in the positive x direction.

In various embodiments, K(m) can be changed as a function of position within the TIMS device by varying the cross-section as a function of position S(x). For a given mass flow of gas Q, $$\rho_1 v_{g1} S_1 = \rho_2 v_{g2} S_2 = Q$$

where $\rho_1$, $v_{g1}$, and $S_1$ are the density, velocity, and cross section, respectively, at a first location and $\rho_2$, $v_{g2}$, and $S_2$ are the density, velocity, and cross section, respectively, at a second location. Thus, at the trapping position $$x, v_g(x) + v_d(x) = 0.:$$

$$v_d(x) = K(m) * E = K_0(m) * \frac{E}{\rho} = K_0'(m) * v_g(x) * S(x) * \frac{E}{Q}$$

Cancelling velocity in both parts of equation results in relation $$K_0'(m) = \text{const}/(E * S(x))$$

Ions having specific value of $K_0'(m)$ will occupy x position based on this relation.

As the gas velocity is greater in regions with a smaller cross section of the TIMS device, separating of ions as a function of ion mobility can be accomplished by having a largest cross section near an first end and decreasing the cross section as the ion nears the second end.

In other embodiments, $K(m)$ can be changed as a function of position within the TIMS device with a constant cross-section S by varying the mass flow $Q(x)$. For a given cross section, $Q(x)=\rho(x)*v_g(x)*S_1$. Thus $v_d(x)=K(m)*E=K_0(m)*E/\rho(x)=K_0'(m)*v_g(x)*E/Q(x)$. Assuming $v_g(x)=-v_d(x)$, the equation reduces to $K_0'(m)=Q(x)/E/S$. When trapped, ions with specific value of $K_0'(m)$ will occupy position on x axis based on the local value of $Q(x)$. The gas velocity can change with the mass flow of the TIMS device. That is, the gas velocity decreases with decreasing mass flow within the TIMS device. In various embodiments, the gas flow can decrease along the direction of gas flow by providing flow paths out of TIMS device. To separate ions according to ion mobility, a gas flow can be supplied near an ion exit end with flow paths out of the device along the length so that the lowest mass flow is near the first end and the highest mass flow is near the second end.

Once the ions have settled into their equilibrium positions, the ions can be released from the device by increasing the electric field to a second magnitude $E_{m2}$ to increase the ion velocity while the gas flow remains the same. All target ions can exit the TIMS device provided the electric field is high enough that the velocity is positive for all target ions for the length of the device.

Figure 3B:
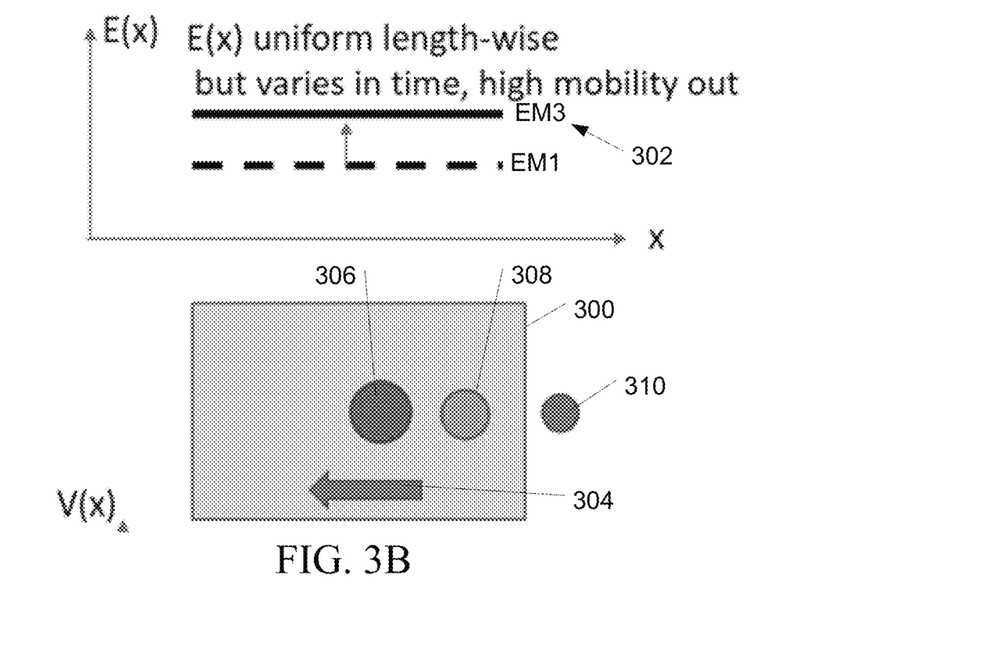

FIG. 3B illustrates ions exiting the TIMS device 300 after the electric field 302 is increased from $E_{m1}$ to $E_{m2}$. The high mobility ions 310 can exit the TIMS device first, followed by the medium mobility ions 308 and then the low mobility ions 306.

Figure 4:
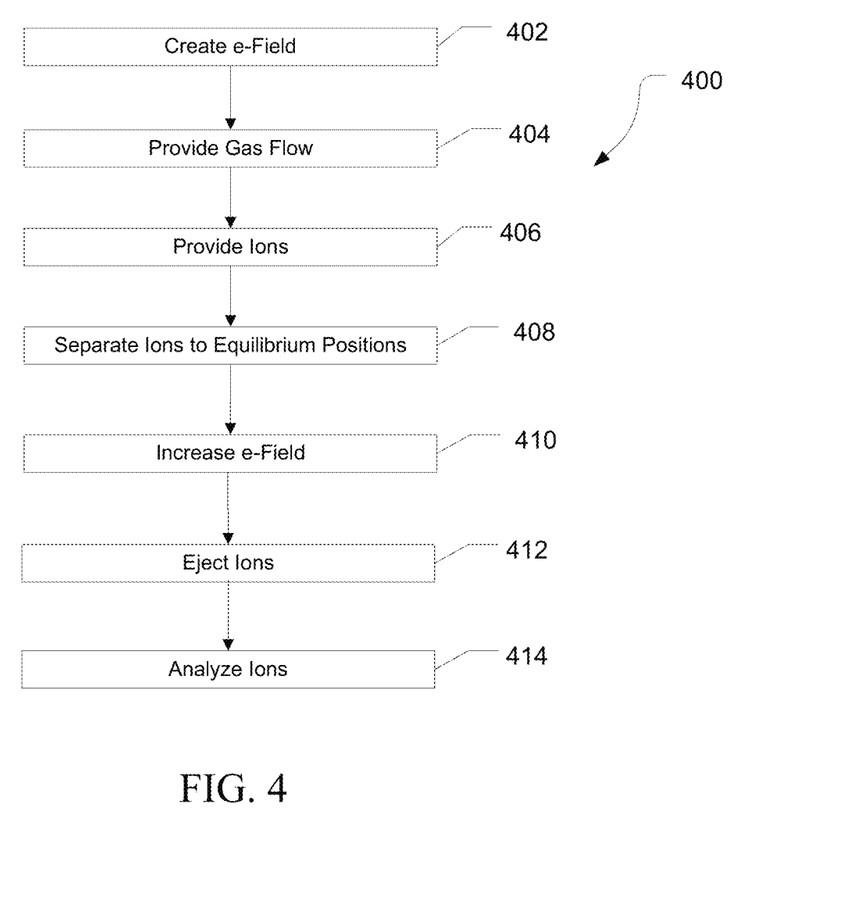
FIG. 4 illustrates an exemplary method of operating a TIMS device, in accordance with various embodiments.

FIG. 4 illustrates a method 400 of operating an ion mobility separator. At 402, an electric field can be created within the ion mobility separator. The electric field can be generated by applying an electrical (DC) potential to electrode along the length of the ion mobility separator. The electric field can be constant along the length of the ion mobility separator and can be set to a first magnitude $E_{m1}$ during a trapping and equilibration time period.

At 404, a gas flow can be provided near a second end of the ion mobility separator. The gas flow entering the ion mobility separator can be constant throughout the operation of the ion mobility separator.

At 406, ions from a plurality of analytes can be introduced into the TIMS device near a first end. The ions can have a range of ion mobilities, such as depending on the identity of the analyte. At 408, the ions can be separated according to ion mobility. The TIMS device can be configured such that an ion can reach an equilibrium position $v(x)=0$ at some point along the length of the TIMS device according to ion mobility. In various embodiments, the position dependence can be accomplished by a change in cross section along the length of the ion mobility separator, such that near the first end has a larger cross section than near the second end. Alternatively, the position dependence can be accomplished by varying the mass flow within the ion mobility separator, such as by providing gas flow paths for gas to escape along the length of the TIMS device. The ions can be separated such that low mobility ions are closer to the first end and high mobility ions are closer to the second end.

At 410, the electric field can be increased, and at 412 the ions can be ejected from the TIMS device. The high mobility ions can be ejected first due to their proximity to the second end, while ions of decreasing ion mobility follow.

At 414, the ions can be analyzed, such as by using a mass spectrometer.

Variable Cross Section

Figure 5A:
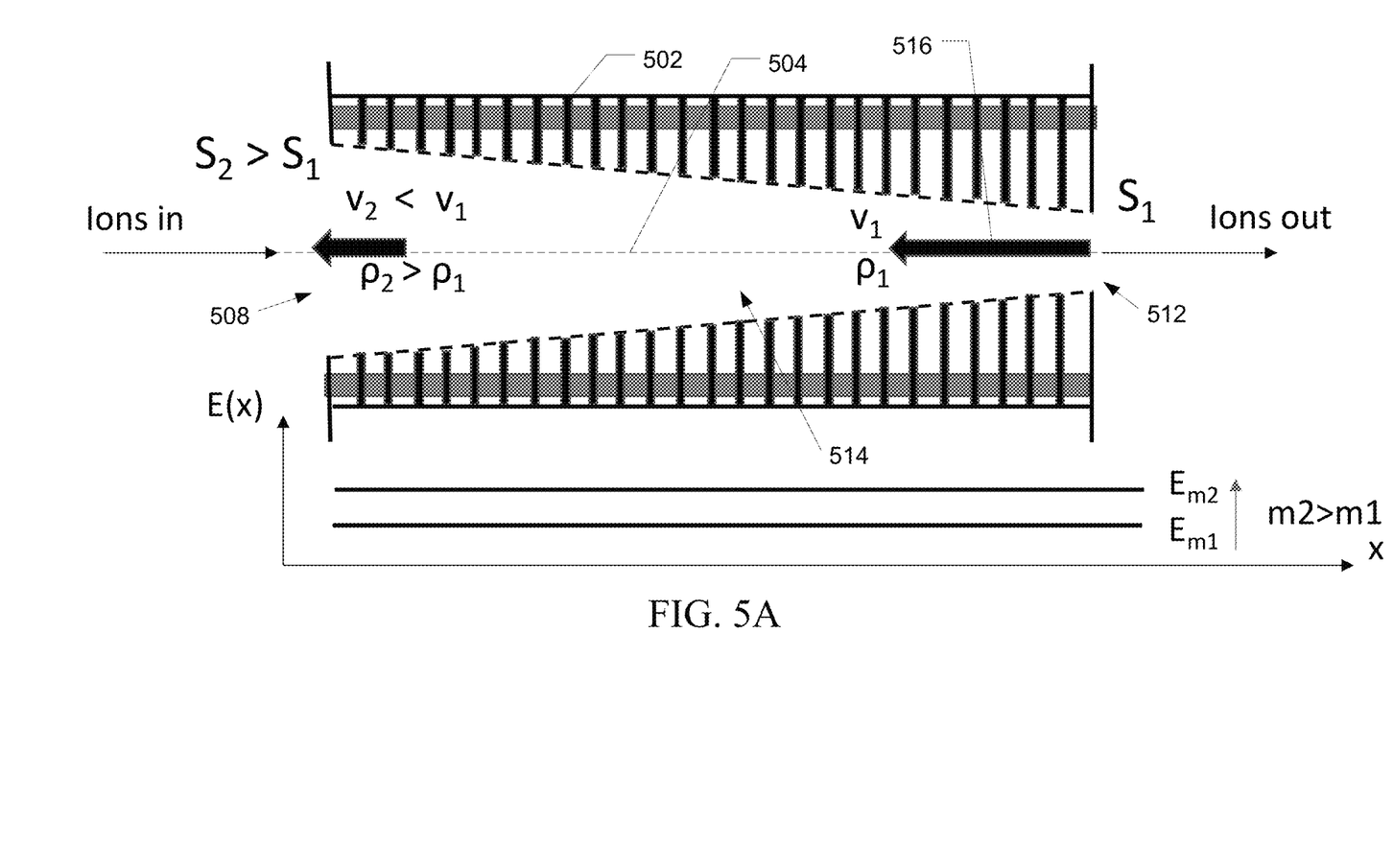
FIGS. 5A and 5B illustrate an exemplary TIMS device having a variable cross section, in accordance with various embodiments.
Figure 5B:
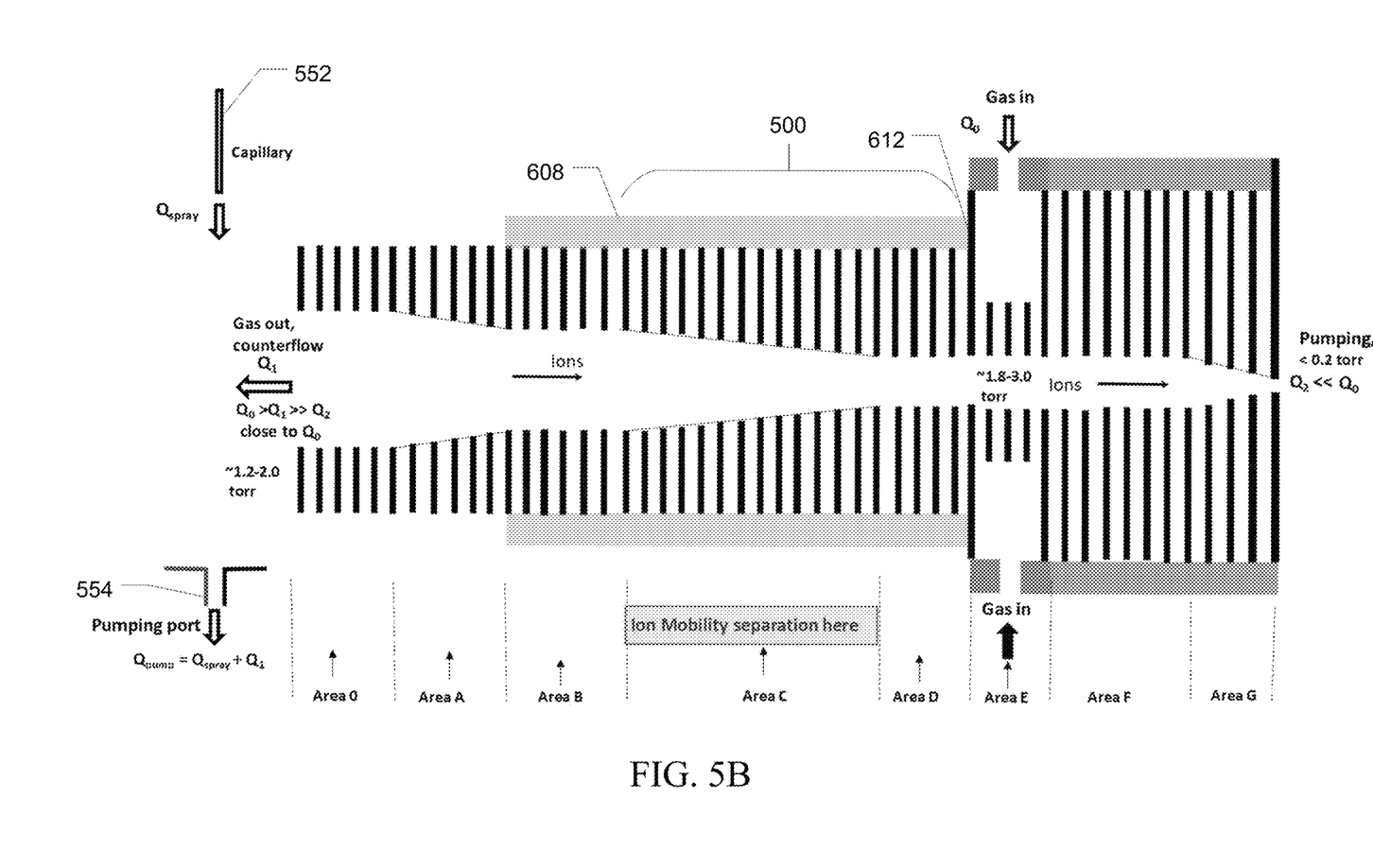

FIGS. 5A and 5B illustrate embodiments of an ion mobility separator 500 with a variable cross section. In FIG. 5A, ion mobility separator 500 can include a plurality of electrodes 502, such as ring electrodes, arranged along an axis 504. Ion mobility separator 500 can have a first end 508 and a second end 512. The electrodes 502 can be arranged such that a channel 514 is formed with a cross-section (S) that decreases from the first end to the second end (positive X direction).

An electric potential can be applied to the electrodes 502 to create a uniform electric field. The electric field can push ions in the positive X direction from the first end 508 to the second end 512.

A gas flow 516 can be supplied at the second end and flow in the direction of the first end (negative X direction). Due to the geometry of the ion mobility separator 500 and the change in cross section, the velocity of the gas can decrease as the gas moves from the second (narrow) end to the first (wide) end, resulting in a variable drag force along the ion mobility separator 500, with a lower drag force at the first end and a high drag force at the second end.

During a trapping and equilibration time period, the electric field can be set at a first magnitude $E_{m1}$ such that $v(x)=0$ for target ions at some point along the length of the ion mobility separator 500. With the ions experiencing a constant e-field force and the decreasing cross section from the first end 508 towards the second end 512, the ions can become trapped at the location dependent on the ion mobility. Ions with higher mobility can advance closer to the second end 512 before becoming trapped. Thus, ions can be separated from lowest ion mobility near the first end 508 to highest ion mobility near the second end 512.

During an ejection time period, the electric field can be set at a second magnitude $E_{m2}$ such $v(x)>0$ throughout the ion mobility separator for all target ions. This can drive the ions of interest through the second end 512 while maintaining the separation based on ion mobility. In alternative embodiments, the electric field can be ramped through a least a portion of the difference between the first magnitude $E_{m1}$ to the second magnitude $E_{m2}$. In particular embodiments, the electric field can jump from $E_{m1}$ to a level slightly below the level corresponding to the highest ion mobility ions of interest and then ramped through the range of ion mobilities of interest to $E_{m2}$.

FIG. 5B illustrates the ion mobility separator 500 in the context of the broader system 550. Sample can be introduced through capillary 552 and ions can be formed. The ions can be drawn into the device using an electric field in area 0. Area 0 has an open geometry with a constant cross section to accept ions. The ions can then move to an ion funnel in area A to focus the ions. Area B has a constant cross section before entering the ion mobility separator 500 in area C. After the ions have been separated based on the mobility of the ions, they pass through areas D, E and F before additional focusing in a second ion funnel of area G. After exiting area G, ions can proceed to a mass analyzer for further analysis.

The gas flow can be introduced in area E. The bulk of the gas flow can flow through the areas D, C, B, A, and 0 until it is removed from the system by pumping port 554.

Variable Mass Flow

Figure 6:
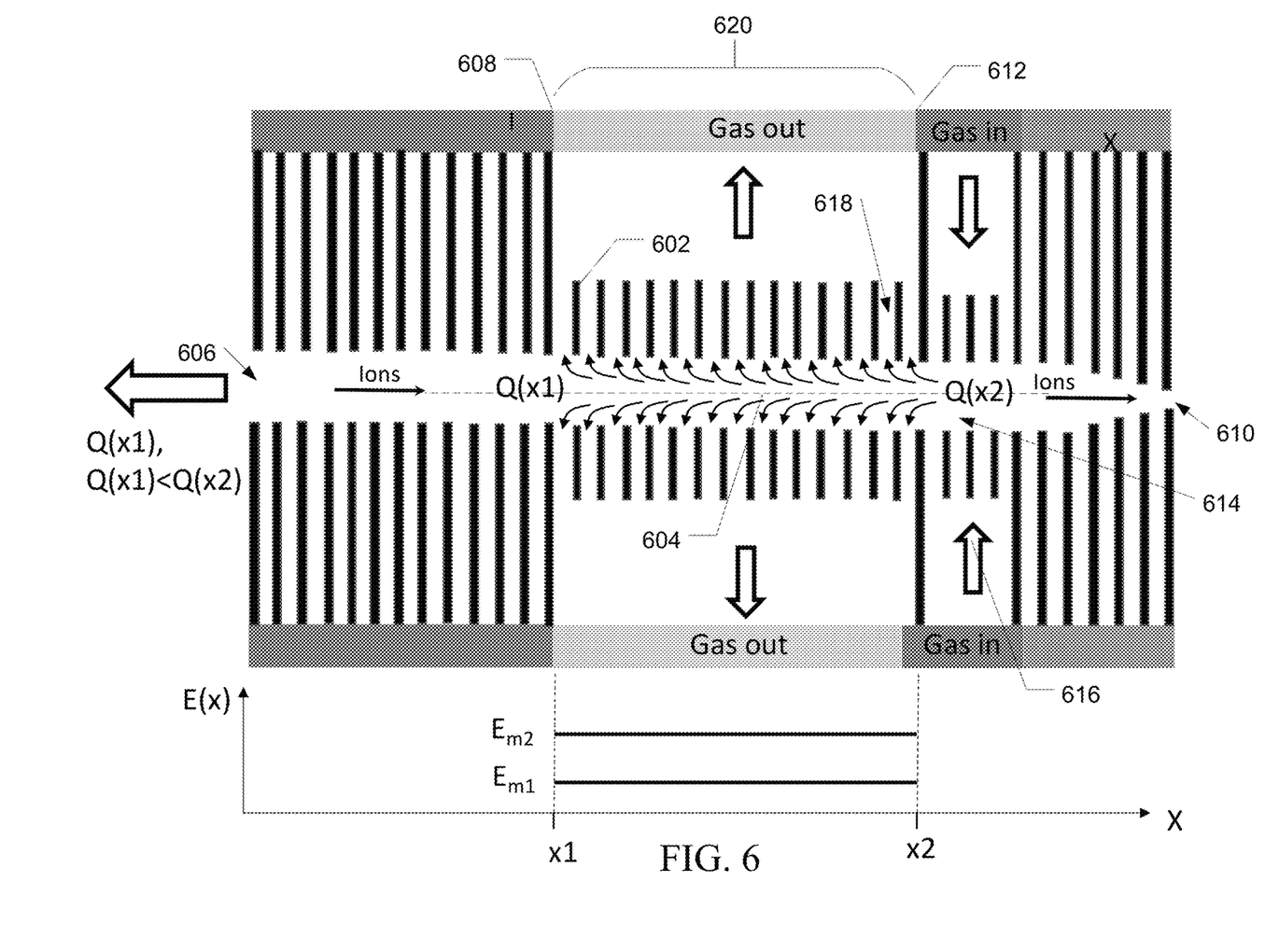
FIGS. 6 and 7 illustrate exemplary TIMS devices having a constant cross section and a variable mass flow, in accordance with various embodiments.

FIG. 6 illustrates an embodiment of an ion mobility separator 600 with a constant cross section and a variable mass flow. Ion mobility separator 600 can include a plurality of electrodes 602, such as ring electrodes, arranged along an axis 604. Ion mobility separator 600 can have an ion entrance 608 and an ion exit 610. The electrodes 602 can be arranged such that a channel 614 is formed with a constant cross-section (S).

An electric potential can be applied to the electrodes 602 to create a uniform electric field. The electric field can push ions in the positive X direction from the ion entrance 606 to the ion exit 610.

A gas flow 616 can be supplied near a second end 612 of a mobility separation region 620 and flow in the direction of the first end 608 of the mobility separation region 620 (negative X direction). Gas flow paths 618 can be provided within a mobility separation region 620, such as between electrodes 602, so that a portion of gas flow 616 can exit the ion mobility separator 600. Within the mobility separation region 620, the electrodes can be uniform and have a similar length or outer diameter to provide gas flow paths 618 of similar length. The similar length of gas flow paths 618 can provide similar restriction on the gas flow. The decrease in mass flow in the negative x direction due to the loss of a portion of the gas can result in a variable drag force along the ion mobility separator 600, with a lower drag force at the first end and a high drag force at the second end.

During a trapping and equilibration time period, the electric field can be set at a first magnitude $E_{m1}$ such that $v(x)=0$ for all target ions at some points along the length of the ion mobility separator 620. With the ions experiencing a constant e-field force and the increasing mass flow from the first end 608 of device 620 towards the second end 612 of device 620, the ions can become trapped at the location dependent on the ion mobility. Ions with higher mobility can advance closer to the second end 612 of device 620 before becoming trapped. Thus, ions can be separated from lowest ion mobility near the first end 608 of device 620 to highest ion mobility near the second end 612 of device 620.

During an ejection time period, the electric field can be set at a second magnitude $E_{m2}$ such $v(x)>0$ throughout the ion mobility separator for all target ions. This can drive the ions through the second end 612 while maintaining the separation based on ion mobility. In alternative embodiments, the electric field can be ramped through a least a portion of the difference between the first magnitude $E_{m1}$ to the second magnitude $E_{m2}$. In particular embodiments, the electric field can jump from $E_{m1}$ to a level slightly below the level corresponding to the highest ion mobility ions of interest and then ramped through the range of ion mobilities of interest to $E_{m2}$.

Figure 7:
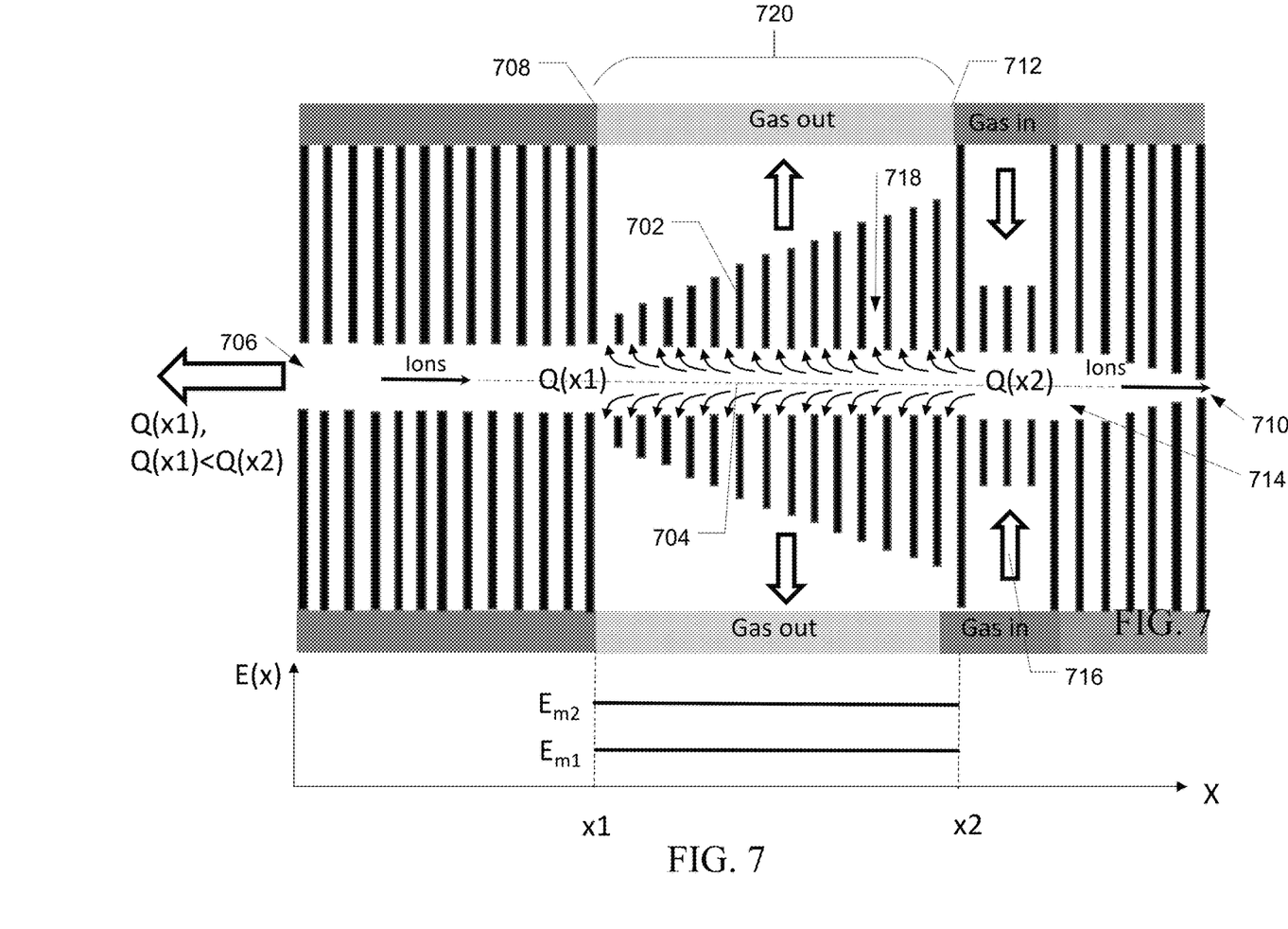

FIG. 7 illustrates another embodiment of an ion mobility separator 700 with a constant cross section and a variable mass flow. Ion mobility separator 700 can include a plurality of electrodes 702, such as ring electrodes, arranged along an axis 704. Ion mobility separator 700 can have an ion entrance 706 and an ion exit 710. The electrodes 702 can be arranged such that a channel 714 is formed with a constant cross-section (S).

An electric potential can be applied to the electrodes 702 to create a uniform electric field. The electric field can push ions in the positive X direction from the ion entrance 706 to the ion exit 710.

A gas flow 716 can be supplied near a second end 712 of an mobility separation region 720 and flow in the direction of the first end 708 of the ion mobility separation region 720 (negative X direction). Gas flow paths 718 can be provided within the ion mobility separation region 720, such as between electrodes 702, so that a portion of gas flow 716 can exit the ion mobility separator 700. Within the mobility separation region 720, the electrodes can have variable lengths or outer diameters to provide gas flow paths 718 of different length. The different lengths of gas flow paths 718 can provide varying restriction on the gas flow. The decrease in mass flow in the negative x direction due to the loss of a portion of the gas can result in a variable drag force along the ion mobility separator 700, with a lower drag force at the first end and a high drag force at the second end.

In contrast to FIG. 6 where the restriction on the flow paths are constant along the length of the TIMS device, the restriction on the flow paths in FIG. 7 vary along the length of the TIMS device, with a higher restriction near the second end 712 with the higher pressure. Since the amount of gas flow out through each flow path is a function of both pressure and restriction, the mass flow profile can be adjusted by varying the length/outer diameter of the electrodes.

During a trapping and equilibration time period, the electric field can be set at a first magnitude $E_{m1}$ such that $v(x)=0$ for all target ions at some points along the length of the ion mobility separator 700. With the ions experiencing a constant e-field force and the increasing mass flow from the first end 708 towards the second end 712, the ions can become trapped at the location dependent on the ion mobility. Ions with higher mobility can advance closer to the second end 712 before becoming trapped. Thus, ions can be separated from lowest ion mobility near the first end 708 to highest ion mobility near the second end 712.

During an ejection time period, the electric field can be set at a second magnitude $E_{m2}$ such $v(x)>0$ throughout the ion mobility separator for all target ions. This can drive the ions through the second end 712 while maintaining the separation based on ion mobility. In alternative embodiments, the electric field can be ramped through a least a portion of the difference between the first magnitude $E_{m1}$ to the second magnitude $E_{m2}$. In particular embodiments, the electric field can jump from Emi to a level slightly below the level corresponding to the highest ion mobility ions of interest and then ramped through the range of ion mobilities of interest to $E_{m2}$.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An ion mobility device comprising:
a plurality of electrodes arranged along an axis, the axis extending from a first end to a second end, the plurality of electrodes configured to receive a gas flow near the second end and provide for an expansion of the gas flow from the second end to the first end such that a first gas velocity at the second end is greater than a second gas velocity at the first end;
a current source configured to:
apply a first potential to the plurality of electrodes to generate a first electric field during a trapping and equilibration time period, the first electric field being uniform along the length of the axis;
apply a second potential to the electrodes during an ejection time period to generate a second electric field, the second electric field being uniform along the length of the axis from the first end to the second end and being greater than the first electric field;
wherein, during the trapping and equilibration time period, ions are separated along the axis based on their ion mobility to equilibrium positions where the force applied by the electric field balances the drag force applied by the gas flow; and
wherein, during the ejection time period, ions are driven out the second end by the second electric field such that the separation achieved during the trapping and equilibration time period is maintained.

2. The ion mobility device of claim 1 wherein the gas flow is constant during the trapping and equilibration time period and the ejection time period.

3. The ion mobility device of claim 1 wherein the plurality of electrodes forms a channel having a cross section that increases from the second end to the first end.

4. The ion mobility device of claim 1 wherein the plurality of electrodes forms a channel of uniform cross section.

5. The ion mobility device of claim 4 wherein at least a subset of the plurality of electrodes create flow paths for the gas flow away from the channel.

6. The ion mobility device of claim 1 wherein at least a subset of the plurality of electrodes have a decreasing length or diameter going in the direction from the second end to the first end.

7. A method comprising:
providing ions to an first end of an ion mobility device, the ion mobility device including a plurality of electrodes arranged along an axis, the axis extending from a first end to a second end;
providing a gas flow near the second end of the ion mobility device, the plurality of electrodes configured to provide for an expansion of the gas flow from the second end to the first end such that a gas flow velocity decreases from the second end to the first end;
applying an electric field at a first magnitude in a direction counter to the gas flow, the electric field being uniform along the axis;
separating ions to equilibrium positions along the axis based on their ion mobility, the equilibrium positions being where the force applied by the electric field balances the drag force applied by the gas flow;
ejecting ions from the second end by increasing the electric field to a second magnitude.

8. The method of claim 7 further comprising ionizing a sample to produce the ions.

9. The method of claim 7 further comprising analyzing the ions after the ions are ejected.

10. The method of claim 7 wherein the gas flow is uniform.

11. The method of claim 7 wherein the plurality of electrodes forms a channel of variable cross section.

12. The method of claim 7 wherein the plurality of electrodes forms a channel of uniform cross section.

13. The method of claim 12 wherein at least a subset of the plurality of electrodes create flow paths for the gas flow away from the channel.

14. The method of claim 7 wherein at least a subset of the plurality of electrodes have a decreasing length or diameter going in the direction from the second end to the first end.

15. A mass spectrometer comprising:
an ion source configured to ionize a sample to produce ions;
an ion mobility device including:
a plurality of electrodes arranged along an axis, the axis extending from a first end to a second end, the plurality of electrodes configured to receive a gas flow near the second end and provide for an expansion of the gas flow from the second end to the first end such that a first gas velocity at the second end is greater than a second gas velocity at the first end; and
a current source configured to:
apply a first potential to the plurality of electrodes to generate a first electric field during a trapping and equilibration time period, the first electric field being uniform along the length of the axis; and
apply a second potential to the electrodes during an ejection time period to generate a second electric field, the second electric field being uniform along the length of the axis from the first end to the second end and being greater than the first electric field;
a mass analyzer configured to analyze the ions;
wherein, during the trapping and equilibration time period, ions are separated along the axis based on their ion mobility to equilibrium positions where the force applied by the electric field balances the drag force applied by the gas flow; and
wherein, during the ejection time period, ions are driven through the second end by the second electric field such that the separation achieved during the trapping and equilibration time period is maintained.

16. The mass spectrometer of claim 15 wherein the gas flow is constant during the trapping and equilibration time period and the ejection time period.

17. The mass spectrometer of claim 15 wherein the plurality of electrodes forms a channel having a cross section that increases from the second end to the first end.

18. The mass spectrometer of claim 15 wherein the plurality of electrodes forms a channel of uniform cross section.

19. The mass spectrometer of claim 18 wherein at least a subset of the plurality of electrodes create flow paths for the gas flow away from the channel.

20. The mass spectrometer of claim 15 wherein at least a subset of the plurality of electrodes have a decreasing length or diameter going in the direction from the second end to the first end.

* * * * *